(12) United States Patent
Senoo et al.

(10) Patent No.: US 12,073,419 B2
(45) Date of Patent: Aug. 27, 2024

(54) PACKAGE MATERIAL MANUFACTURING MACHINE MANAGEMENT SYSTEM

(71) Applicant: MITSUBISHI HEAVY INDUSTRIES MACHINERY SYSTEMS, LTD., Kobe (JP)

(72) Inventors: Shinichiro Senoo, Kobe (JP); Kazutaka Tokumo, Kobe (JP); Naoyuki Fukushige, Kobe (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 893 days.

(21) Appl. No.: 16/980,621

(22) PCT Filed: Mar. 11, 2019

(86) PCT No.: PCT/JP2019/009643
§ 371 (c)(1),
(2) Date: Sep. 14, 2020

(87) PCT Pub. No.: WO2019/188183
PCT Pub. Date: Oct. 3, 2019

(65) Prior Publication Data
US 2021/0019764 A1 Jan. 21, 2021

(30) Foreign Application Priority Data
Mar. 27, 2018 (JP) .................. 2018-059576

(51) Int. Cl.
*G06Q 30/018* (2023.01)
*B31B 50/00* (2017.01)
(Continued)

(52) U.S. Cl.
CPC ....... *G06Q 30/0185* (2013.01); *B31B 50/006* (2017.08); *B31B 50/88* (2017.08);
(Continued)

(58) Field of Classification Search
CPC .. B31B 50/006; B31B 50/88; G06Q 30/0185; G06Q 10/06395; G06Q 50/04;
(Continued)

(56) References Cited

U.S. PATENT DOCUMENTS 11,093,186 B2 * 8/2021 Sloan, IV ............. G06T 7/0004
11,392,110 B2 * 7/2022 Chiba .................... G06Q 50/04
(Continued)

FOREIGN PATENT DOCUMENTS

| JP | S62-290527 A | 12/1987 |
|----|--------------|---------|
| JP | H07-9708 U | 2/1995 |

(Continued)

OTHER PUBLICATIONS

Japan Patent Office, "Office Action for Japanese Patent Application 2018-059576," May 31, 2022.
(Continued)

*Primary Examiner* — Sameh Tawfik
(74) *Attorney, Agent, or Firm* — HAUPTMAN HAM, LLP

(57) ABSTRACT

An objective of the present invention is to enable the use of identification information, which is usable in a traceability system, in the management of a machine for manufacturing a package material. Provided is a management system of a manufacturing machine for manufacturing a package material which is usable in the distribution of articles, the system including: printing devices for, in a process of manufacturing a package material, printing on the package material unique identification information which is usable in traceability in the distribution of articles; identification information reading devices which are installed downstream of the printing devices for reading the identification information; and machine management devices for acquiring individual characteristic information of the package material, and man-
(Continued)

aging the manufacturing machine on the basis of machine management information in which the acquired individual characteristic information is associated with the identification information read by the identification information reading devices.

4 Claims, 5 Drawing Sheets

(51) Int. Cl.
  *B31B 50/88* (2017.01)
  *B65G 61/00* (2006.01)
  *G06K 1/12* (2006.01)
  *G06K 7/14* (2006.01)
  *G06Q 10/0639* (2023.01)
  *G06Q 50/04* (2012.01)
  *G07C 3/00* (2006.01)

(52) U.S. Cl.
  CPC ............ *B65G 61/00* (2013.01); *G06K 1/121* (2013.01); *G06K 7/1413* (2013.01); *G06Q 10/06395* (2013.01); *G06Q 50/04* (2013.01); *G07C 3/005* (2013.01)

(58) Field of Classification Search
  CPC ...... B65G 61/00; G06K 1/121; G06K 7/1413; G07C 3/005
  USPC .......................................................... 493/53
  See application file for complete search history.

(56) References Cited

U.S. PATENT DOCUMENTS

| | | | | |
|---|---|---|---|---|
| 11,541,565 | B2* | 1/2023 | Iwai | ............... B26D 7/0675 |
| 2002/0055925 | A1 | 5/2002 | Kondo et al. | |
| 2003/0083890 | A1 | 5/2003 | Duncan et al. | |
| 2003/0124471 | A1 | 7/2003 | Ishii et al. | |
| 2006/0005722 | A1* | 1/2006 | Nobukawa | ............... B41F 13/12 |
| | | | | 101/183 |
| 2008/0129987 | A1* | 6/2008 | Ogawa | ............... B41F 33/0036 |
| | | | | 356/237.1 |
| 2010/0018416 | A1* | 1/2010 | Senoo | ............... B41F 33/10 |
| | | | | 101/147 |
| 2010/0190626 | A1* | 7/2010 | Taketsugu | ............... B65H 31/32 |
| | | | | 198/429 |
| 2012/0015789 | A1* | 1/2012 | Harrington | ............... B31B 50/88 |
| | | | | 493/53 |
| 2016/0361886 | A1 | 12/2016 | Suzuki et al. | |
| 2017/0087793 | A1 | 3/2017 | Mark et al. | |
| 2017/0087879 | A1 | 3/2017 | Mark | |
| 2017/0087900 | A1 | 3/2017 | Mark et al. | |
| 2018/0178478 | A1* | 6/2018 | Kodama | ............... B31B 50/146 |
| 2019/0018628 | A1* | 1/2019 | Sloan, IV | ............... G06F 3/1215 |
| 2020/0118262 | A1 | 4/2020 | Takemoto et al. | |
| 2021/0178719 | A1* | 6/2021 | Suzuki | ............... G06Q 50/04 |
| 2021/0311677 | A1* | 10/2021 | Sloan, IV | ............... B26D 7/27 |
| 2022/0097334 | A1* | 3/2022 | Miyashita | ............... B31B 50/006 |
| 2022/0106146 | A1* | 4/2022 | Kanazawa | ............... B65H 33/00 |

FOREIGN PATENT DOCUMENTS

| | | |
|---|---|---|
| JP | H07-156459 A | 6/1995 |
| JP | 2000-142647 A | 5/2000 |
| JP | 2001-171637 A | 6/2001 |
| JP | 2002-149221 A | 5/2002 |
| JP | 2002-249117 A | 9/2002 |
| JP | 2003-72738 A | 3/2003 |
| JP | 2003-191918 A | 7/2003 |
| JP | 2004-224383 A | 8/2004 |
| JP | 2005-507838 A | 3/2005 |
| JP | 2007-15704 A | 1/2007 |
| JP | 2009-245298 A | 10/2009 |
| JP | 2011-103049 A | 5/2011 |
| JP | 2017-1265 A | 1/2017 |
| JP | 2017-1266 A | 1/2017 |
| JP | 2017-1267 A | 1/2017 |
| JP | 2017-61147 A | 3/2017 |
| JP | 2017-77727 A | 4/2017 |
| JP | 2017-94715 A | 6/2017 |
| JP | 6273594 B1 | 2/2018 |

OTHER PUBLICATIONS

Japan Patent Office, "Office Action for Japanese Patent Application 2018-059576," Nov. 22, 2022.
PCT/ISA/210, "International Search Report for International Application No. PCT/JP2019/009643," Jun. 11, 2019.
PCT/ISA/237, "Written Opinion of the International Searching Authority for International Application No. PCT/JP2019/009643," Jun. 11, 2019.

* cited by examiner

PACKAGE MATERIAL MANUFACTURING MACHINE MANAGEMENT SYSTEM

RELATED APPLICATIONS

The present application is National Phase of International Application No. PCT/JP2019/009643 filed Mar. 11, 2019, and claims priority from Japanese Application No. 2018-059576, filed Mar. 27, 2018, the disclosure of which is hereby incorporated by reference herein in its entirety.

TECHNICAL FIELD

The invention relates to a management system of a package material manufacturing machine suitable for the use in management of corrugators or carton-forming machines.

BACKGROUND ART

Recently, managing a distribution history of articles, a so-called traceability system has been developed. For this system, it is necessary to individually identify articles and to link the identified articles with distribution history information of the articles.

As the means for individually identifying articles, a method of attaching a label, in which identification information such as an information code unique to an article is described, to a container packaging the article is common. In addition, as disclosed in PTL1, a method of printing a unique barcode on a container packaging an article using inkjet printing is also proposed.

CITATION LIST

Patent Literature

[PTL 1] Japanese Unexamined Patent Application Publication No. 2007-15704

SUMMARY OF INVENTION

Technical Problem

Incidentally, there is a corrugated box as being widely used as a package material (container) for packaging the articles. The corrugated box is obtained by three-dimensionally assembling a flat sheet-shaped corrugated carton (carton-forming corrugated board). The sheet-shaped corrugated carton is manufactured by processing a corrugated board using a carton-forming machine. The corrugated board is manufactured from base paper using a corrugated board manufacturing apparatus (corrugating machine).

In manufacturing of a package material such as a sheet-shaped corrugated carton or a corrugated board which is a material of the corrugated carton, it is necessary to manage the manufacturing machine, and if the unique identification information can be used also in the management of the machine, it is possible to improve the productivity.

However, in the related, no attention has been paid to the use of such identification information.

The invention has been made in a focus on the problem, and an object of the invention is to provide a management system of a package material manufacturing machine, a traceability system, and a management method of a package material manufacturing machine which enable the use of identification information, which is usable in the traceability system, in the management of a manufacturing machine of a package material.

Solution to Problem (1) In order to achieve the object, a management system of a package material manufacturing machine according of the invention is a management system of a manufacturing machine that manufactures a package material usable in distribution of articles, the management system including: printing units for, in a process of manufacturing the package material, printing on the package material unique identification information which is usable in traceability in the distribution of the articles; identification information reading devices which are installed downstream of the printing units and read the identification information; and machine management devices for acquiring individual characteristic information of the package material, and managing the manufacturing machine on the basis of machine management information in which the acquired individual characteristic information is associated with the identification information read by the identification information reading devices.

(2) It is preferable that the manufacturing machine includes a corrugated board manufacturing apparatus that manufactures a corrugated board from base paper, and the identification information reading device is installed on a downstream portion of the corrugated board manufacturing apparatus.

(3) It is preferable that the manufacturing machine includes a carton-forming machine that manufactures a carton-forming corrugated board from a corrugated board, and the identification information reading device is installed on a downstream portion of the carton-forming machine.

(4) It is preferable that the machine management device includes a first machine management device that manages the corrugated board manufacturing apparatus, and a second machine management device that manages the carton-forming machine, and the management system includes a higher-lever management device that is connected to the first machine management device and the second machine management device to exchange information with the first machine management device and the second machine management device.

(5) It is preferable that the printing unit is installed inside the corrugated board manufacturing apparatus.

(6) It is preferable that the corrugated board manufacturing apparatus includes a single facer, a double facer, a slitter, and a cutoff in order from an upstream side, and the printing unit is installed in at least one of a flow path of base paper in the corrugated board manufacturing apparatus, immediately before the slitter, immediately after the slitter, and immediately before the cutoff.

(7) It is preferable that the individual characteristic information includes defect information of a defective corrugated board as the corrugated board which is defective, the management system includes a first defect information acquisition device that detects the defective corrugated board from among the manufactured corrugated boards to acquire the defect information, and when the first defect information acquisition device acquires the defect information, the machine management device changes manufacturing conditions of the manufacturing machine or outputs change guide information for changing the manufacturing conditions on the basis of the defect information acquired by the first defect information acquisition device.

(8) It is preferable that, in a case where the defective corrugated board is discarded, the printing unit uses again the identification information printed on the discarded defective corrugated board, and performs subsequent printing.

(9) It is preferable that the individual characteristic information includes defect information of a defective carton-forming corrugated board as the carton-forming corrugated board which is defective, the management system includes a second defect information acquisition device that detects the defective carton-forming corrugated board from among the manufactured carton-forming corrugated boards to acquire the defect information, and when the second defect information acquisition device acquires the defect information, the machine management device changes manufacturing conditions of the manufacturing machine or outputs change guide information for changing the manufacturing conditions on the basis of the defect information acquired by the second defect information acquisition device.

(10) It is preferable that, in a case where the defective carton-forming corrugated board is discarded, the printing unit uses again the identification information printed on the discarded defective carton-forming corrugated board, and performs subsequent printing.

(11) It is preferable that the machine management device includes a defect information acquisition unit that acquires defect information of the carton-forming corrugated board transmitted from a distribution system of the articles, and when the defect information acquisition unit acquires the defect information, the machine management device changes manufacturing conditions of the manufacturing machine or outputs change guide information for changing the manufacturing conditions on the basis of the defect information acquired by the defect information acquisition unit.

(12) It is preferable that in a case where use end information of the carton-forming corrugated board transmitted from a distribution system of the articles is acquired, the printing unit uses again the identification information printed on the carton-forming corrugated board of which the use is ended, and performs subsequent printing.

(13) A traceability system of the invention includes the above-described management system of a package material manufacturing machine; a distribution identification information reading device that reads the identification information in a process of distribution of the articles; a logistics management device that manages the distribution of the articles on the basis of the identification information read by the distribution identification information reading device; an integrated management device which is a higher-lever management device that is connected to the machine management devices of the management system and the logistics management device to exchange information with the machine management devices of the management system and the logistics management device, and integrally manages the machine management devices and the logistics management device.

(14) It is preferable that the integrated management device collects defect information of the carton-forming corrugated board through the logistics management device, and transmits the collected defect information to the machine management device.

(15) A management method of a package material manufacturing machine of the invention is a management method of a manufacturing machine that manufactures a package material usable in distribution of articles, the management method including: a printing step of, in a process of manufacturing the package material, printing on the package material unique identification information which is usable in traceability in the distribution of the articles; an identification information reading step of reading the identification information after the printing step; an individual characteristic information acquisition step of acquiring individual characteristic information of the package material; and a machine management step of associating the individual characteristic information acquired in the individual characteristic information acquisition step with the identification information read in the identification information reading step and of managing the manufacturing machine on the basis of machine management information.

Advantageous Effects of Invention

According to the invention, since identification information which is usable in a traceability system is used in the management of a manufacturing machine of a corrugated product, it is possible to improve the productivity.

DESCRIPTION OF EMBODIMENTS

Figure 1:
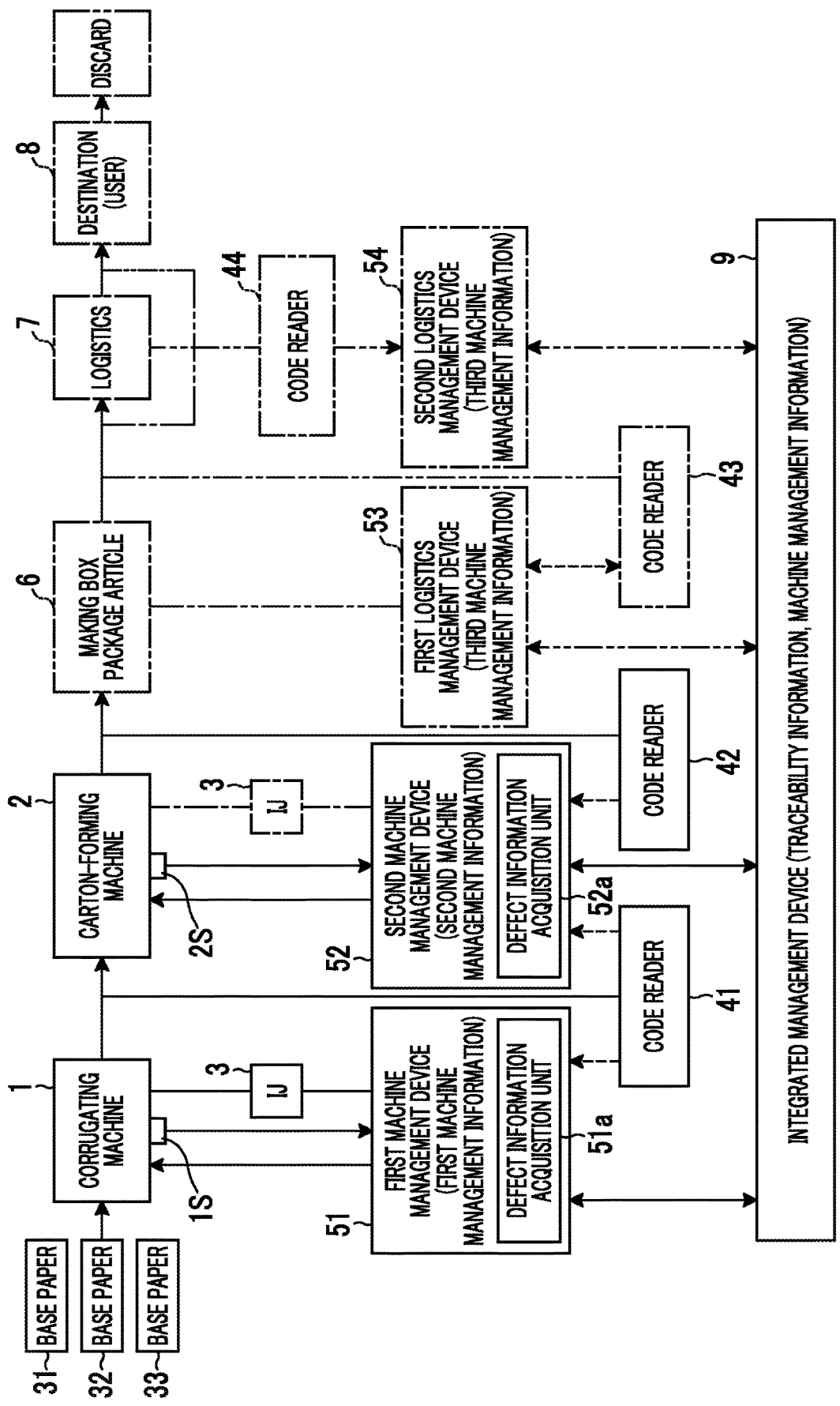
FIG. 1 is a block diagram illustrating a management system of a package material manufacturing machine and a traceability system using the same according to an embodiment of the invention.

Hereinafter, embodiments of the invention will be described with reference to the drawings.

Note that each embodiment described below is merely an example, and there is no intention to exclude various modifications and application of techniques that are not explicitly described in the following embodiment. The configuration of the following embodiment can be variously modified and implemented without departing from the spirit thereof, and can be selected as necessary or combined as appropriate.

[1. Management System of Package Material Manufacturing Machine and Traceability System]

Package materials according to an embodiment are a corrugated board 36 and a carton-forming corrugated board 37 illustrated in FIG. 3, and as illustrated by a solid line in FIG. 1, package material manufacturing machines are a corrugated board manufacturing apparatus (hereinafter, referred to as a corrugating machine) 1 which manufactures a corrugated board from base paper (top liner 31, medium 32, bottom liner 33) and a carton-forming machine 2 which manufactures a carton-forming corrugated board from the corrugated board.

These corrugated board 36 and carton-forming corrugated board 37 are then assembled into a corrugated box, and are used in distribution of articles by being used as a package container in which an article is packaged.

The present management system includes an ink jet printer 3 as a printing unit that prints unique identification information, which is usable in traceability in the distribution of articles, on each corrugated board 36 or each carton-forming corrugated board 37. Here, a barcode 38 (refer to FIG. 3) is printed as the identification information. As the barcode 38, there are various one-dimensional barcodes and various two-dimensional barcodes, and any barcode may be used. Further, the identification information is not limited thereto.

The present management system includes code readers 41 and 42 as the identification information reading devices which read the printed identification information, at a downstream portion of the corrugating machine 1 and a downstream portion of the carton-forming machine 2, respectively.

Further, the present management system includes defective sensors 1S and 2S as defect information acquisition devices that acquire defect information of a product which is a part of individual characteristic information of each corrugated board 36 or each carton-forming corrugated board 37, at important points of the corrugating machine 1 and the carton-forming machine 2.

The individual characteristic information also includes production information such as date, destination, and lot in addition to the defect information.

The present management system includes a first machine management device 51 that manages the corrugating machine 1, and a second machine management device 52 that manages the carton-forming machine 2. These machine management devices 51 and 52 create machine management information in which barcode information read by the code readers 41 and 42 is associated with the individual characteristic information collected by the defective sensors 1S and 2S, and manage the corrugating machine 1 or the carton-forming machine 2 on the basis of the machine management information.

Hereinafter, the configurations of the corrugating machine 1 and the carton-forming machine 2 as the package material manufacturing machine will be described, and then the machine management devices 51 and 52 will be described.

[1.1. Corrugating Machine]

Figure 2:
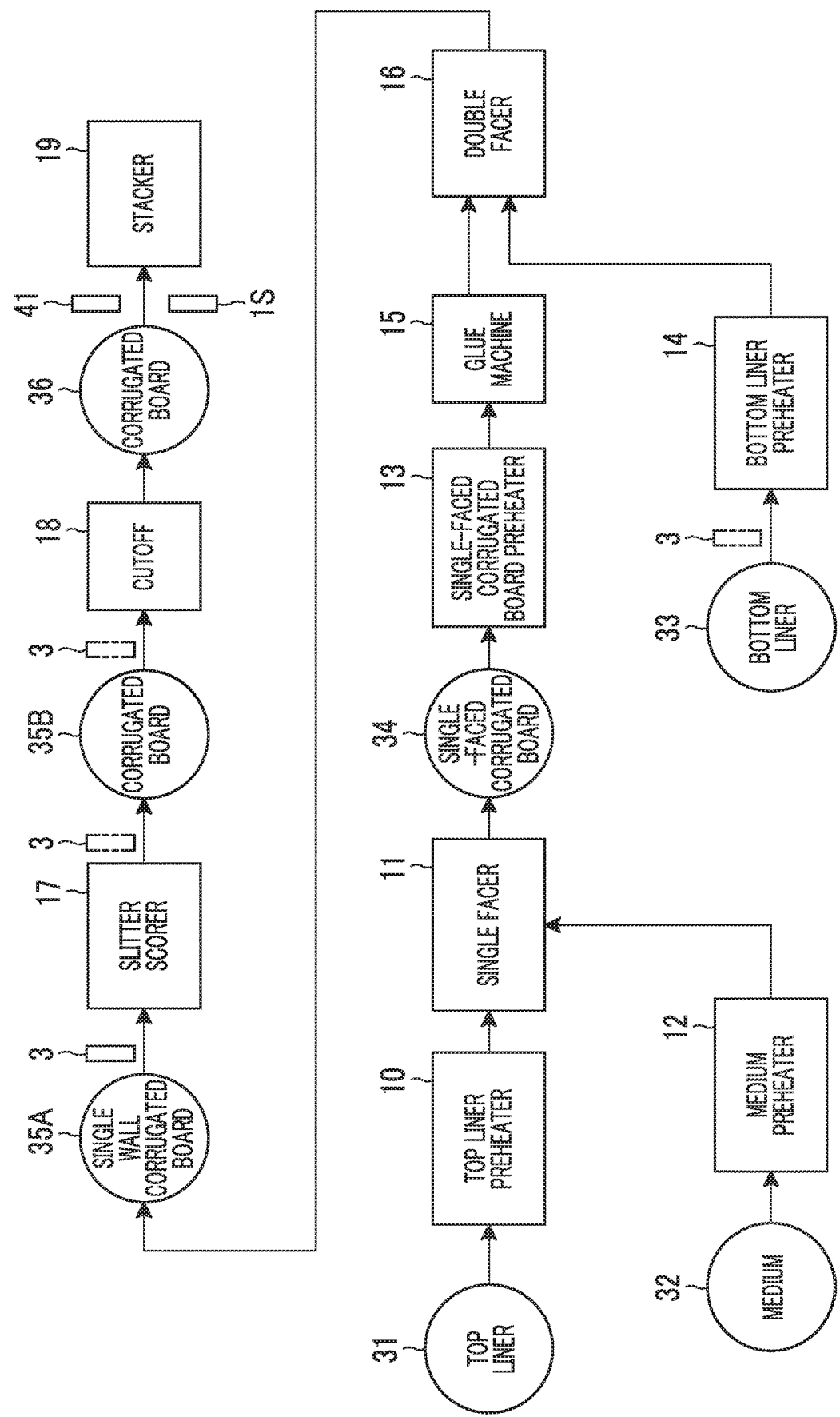
FIG. 2 is a block diagram illustrating a configuration of a corrugated board manufacturing apparatus according to an embodiment of the invention.

Here, a single wall corrugating machine 1 is exemplified. As illustrated in FIG. 2, the corrugating machine 1 includes, as main components, a top liner preheater 10 that heats the top liner 31, a medium preheater 12 that heats the medium 32, a single facer 11 which takes up and applies glue on the medium 32 heated by the medium preheater 12 and bonds the top liner 31 heated by the top liner preheater 10 to the medium 32, a single-faced corrugated board preheater 13 that heats a single-faced corrugated board 34 formed by the single facer 11, a bottom liner preheater 14 that heats the bottom liner 33, a glue machine 15 that applies glue on the single-faced corrugated board 34 heated by the single-faced corrugated board preheater 13, a double facer 16 that creates a corrugated board web (single wall corrugated board) 35A by bonding the bottom liner 33 heated by the bottom liner preheater 14 to the single-faced corrugated board 34 applied with glue by the glue machine 15, a slitter scorer that creates a plurality of web-shaped corrugated boards 35B by performing slitting or creasing on the corrugated board web 35A created by the double facer 16, a cutoff 18 that produces a corrugated board having a plate shape (referred to as plate-shaped corrugated board) 36 as a divided plate-shaped final product by cross-cutting the plurality of web-shaped corrugated boards 35B created by the slitter scorer 17, and a stacker 19 that stacks the plate-shaped corrugated board 36 in order of completion.

Figure 3:
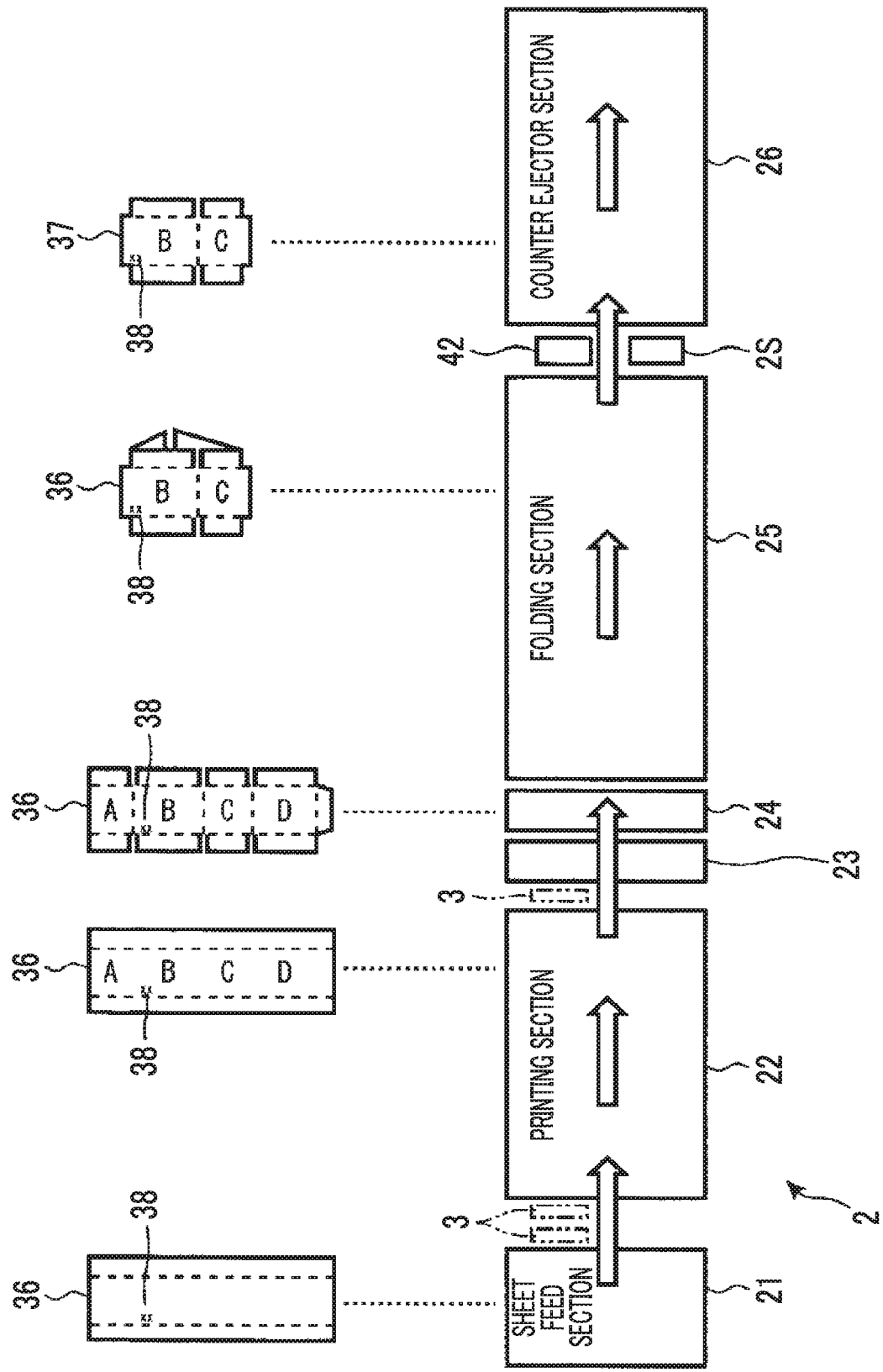
FIG. 3 is a block diagram illustrating a configuration of a carton-forming machine according to an embodiment of the invention.

The corrugating machine 1 includes the ink jet printer 3 which prints the barcode 38 at a position capable of identifying each carton-forming corrugated board 37 that is manufactured by the carton-forming machine 2 illustrated in FIG. 3 using the corrugated board 36 manufactured by the corrugating machine 1. Here, the ink jet printer 3 is disposed immediately before the slitter scorer 17, but the disposition of the ink jet printer 3 is not limited thereto. For example, the ink jet printer 3 may be disposed on the flow path of the base paper (bottom liner 33) entering the double facer 16, immediately after the slitter scorer 17, or immediately before the cutoff 18. In FIG. 2, a case in which the ink jet printer 3 is disposed above the corrugated board 36 to perform printing on the upward surface of the corrugated board 36 from above the corrugated board 36 is illustrated, but the ink jet printer 3 may be disposed below the corrugated board 36 to perform printing on the downward surface of the corrugated board 36 from below the corrugated board 36.

The barcode 38 printed in the stage of the corrugated board 36 needs to be usable in traceability in distribution of articles when the corrugated board is assembled into a corrugated box and used as a package container in which an article is packaged. That is, it is necessary to print the barcode 38 at a position at which it is easy to read even in a case where the corrugated board is used as a package container. Therefore, in the manufacturing stage of the corrugated board 36, the position of a surface of the carton-forming corrugated board 37, which is manufactured from the corrugated board 36, to be exposed when being used as a package container is grasped, the surface and position where the barcode 38 is printed are set, and printing by the ink jet printer 3 is performed on the basis of the surface and the position.

The printing location of the barcode 38 is not limited to one.

In case of performing printing on the corrugating machine 1, a plurality of barcodes 38 may be printed at a designated location from carton-forming information (die-cutting, box shape, and the like). In addition, in the carton-forming machine 2, as with the corrugating machine 1, a plurality of barcodes 38 may be printed at a designated location of the carton-forming corrugated board 37.

In the embodiment, the code reader 41 is disposed immediately before the stacker 19. The code reader 41 is also disposed on the basis of the surface and position where the barcode 38 is printed.

Further, the defective sensor 1S (first defect information acquisition device) that detects a defective corrugated board by determining the quality of the manufactured corrugated board 36, and acquires defect information of the detected defective corrugated board is installed downstream of the corrugating machine 1. Here, the defective sensor 1S is disposed immediately before the stacker 19.

The defective sensor 1S detects poor adhesion or distortion such as warpage of the corrugated board 36 from cameras imaging the manufactured corrugated board 36 from various directions and images captured by the cameras, and determines the corrugated board 36, in which the poor adhesion or distortion above a certain level is detected, as the defective corrugated board. Further, the defect information is information on the type of defect, and the type of defect includes poor adhesion and distortion such as warpage.

[1.2. Carton-Forming Machine]

As illustrated in FIG. 3, the carton-forming machine 2 is provided with, a sheet feed section 21, a printing section 22, a slotter creaser section 23, a die cutting section 24, a folding section 25, and a counter ejector section 26 in order along the processing steps. FIG. 3 illustrates steps in which the plate-shaped corrugated board 36 is processed into the carton-forming corrugated board 37 above the respective sections of the device configuration of the carton-forming machine 2 in correspondence with the sections.

A large number of corrugated boards 36 are loaded in the sheet feed section 21 in a state of being stacked, and the sheet feed section 21 supplies the corrugated boards one by one to the printing section 22. In the embodiment, the barcode 38 is already printed on the loaded corrugated board 36.

The printing section 22 includes printing units having a predetermined number of colors, and in the printing section 22, the inks of the respective colors are sequentially printed on the corrugated board 36 which is transported one by one by a transport conveyor.

In the slotter creaser section 23 and the die cutting section 24, slotting and creasing line making are performed on the corrugated board 36 on which the printing is performed by the printing section 22. That is, slotting and creasing line making are performed in the slotter creaser section 23, and perforating and die-cutting of hand holes, air holes, and the like are performed in the die cutting section 24.

Then, in the folding section 25, glue is applied to the margin of one end of the corrugated board 36, which has been subjected to the slotting and creasing line making, in a left and right direction, folding processing is performed such that both left and right end portions of the corrugated board 36 overlap on the rear side, that is, lower side, and the both left and right end portions of the folded corrugated board 36 are bonded to each other using glue to form the carton-forming corrugated board 37.

In the counter ejector section 26, the carton-forming corrugated board 37 processed in the folding section 25 is counted and is stacked in the stacker. Then, in a case where a predetermined number of carton-forming corrugated boards 37 are stacked, this carton-forming corrugated board group is shipped as one unit.

In the embodiment, the code reader 42 is disposed immediately before the counter ejector section 26. The code reader 42 is also disposed on the basis of the surface and position where the barcode 38 is printed.

Further, the defective sensor 2S (second defect information acquisition device) that detects a defective carton-forming corrugated board by determining the quality of the manufactured carton-forming corrugated board 37, and acquires defect information of the detected defective corrugated board is installed downstream of the carton-forming machine 2. Here, the defective sensor 2S is disposed immediately before the counter ejector section 26.

The defective sensor 2S detects poor adhesion or distortion such as warpage of the carton-forming corrugated board 37 from cameras imaging the manufactured carton-forming corrugated board 37 from various directions and images captured by the cameras, and determines the carton-forming corrugated board 37, in which the poor adhesion or deformation above a certain level is detected, as the defective carton-forming corrugated board. The defect information is information on the type of defect as described above, and the type of defect includes poor adhesion, deformation, and the like.

[1.3. Machine Management Device]

As illustrated in FIG. 1, in the machine management device 51 that manages the corrugating machine 1, detection information of the code reader 41 is input, and when the defective sensor 1S detects the defective corrugated board, the detection information is input. In the machine management device 51, first machine management information in which the detected barcode information is associated with the defect information of the defective corrugated board is created. The defect information included in the first machine management information is information on the type of defect, and the type of defect also includes defects requiring discard due to waste paper generated in the splice or order change, and dirt generated during delivering the corrugated board 36 from a machine to a machine (for example, from the corrugating machine 1 to the carton-forming machine 2) in addition to the product defect in which poor adhesion or distortion such as warpage is included.

From the first machine management information, the defective corrugated board 36 can be specified using the barcode information. Here, since the defective sensor 1S and the code reader 41 are disposed at extremely close positions, the barcode 38 of the defective corrugated board is read at the same time as the detection of the defective corrugated board, but even in a case where the defective sensor 1S and the code reader 41 are far from each other, it is possible to specify the defective corrugated board 36 on the basis of the production speed of the machine (transportation speed of base paper or corrugated board), the distance between the defective sensor 1S and the code reader 41, and the like.

The machine management device 51 estimates the cause of defect from manufacturing conditions (including machine conditions) at the time of the occurrence of defect, on the basis of the defect information, and performs processing for eliminating the cause of defect. For example, if the cause of defect can be handled by the change of the manufacturing conditions that can be automatically performed, the change of the manufacturing conditions is performed, and if the cause of defect is the change of the manufacturing conditions or maintenance of the machine requiring the operator' operation, change guide information to change the manufacturing conditions is output.

As illustrated in FIG. 1, in the machine management device 52 that manages the carton-forming machine 2, detection information of the code reader 42 is input, and when the defective sensor 2S detects the defective corrugated board, the detection information is input. In the machine management device 52, second machine management information in which the defect information of the detected defective carton-forming corrugated board is associated with the barcode information thereof is created. Further, the defect information is information on the type of defect, and the type of defect includes poor adhesion, and deformation such as fishtail or warpage.

The type of defect also includes defects requiring discard due to waste paper generated in the order change, and dirt generated during delivering the corrugated board from a machine to a machine (for example, from the corrugating machine 1 to the carton-forming machine 2) in addition to the product defect.

From the second machine management information, the defective carton-forming corrugated board 37 can be specified using the barcode information. Here, since the defective sensor 2S and the code reader 42 are disposed at extremely close positions, the barcode 38 of the defective corrugated board is read at the same time as the detection of the defective corrugated board, but, as with the above description, even in a case where the defective sensor 2S and the code reader 42 are far from each other, it is possible to specify the defective carton-forming corrugated board 37 on the basis of the production speed of the machine (transportation speed of the corrugated board), the distance between the defective sensor 2S and the code reader 42, and the like.

The machine management device 52 estimates the cause of defect from manufacturing conditions (including machine conditions) at the time of the occurrence of defect, and performs processing for eliminating the cause of defect. For example, if the cause of defect can be handled by the change of the manufacturing conditions that can be automatically performed, the change of the manufacturing conditions is performed, and if the cause of defect is the change of the manufacturing conditions or maintenance of the machine requiring the operator' operation, change guide information to change the manufacturing conditions is output. In addition, if the cause of defect is in the corrugating machine 1, information indicating the fact is output.

As illustrated in FIG. 1, the machine management devices 51 and 52 are connected to an integrated management device 9 as a higher-lever management device. The integrated management device 9 manages traceability information in the distribution of articles (logistics) described below, and manages machine management information.

The machine management information includes third machine management information including defect information input from various locations in a logistics step described below in addition to the first machine management information input from the machine management device 51 and the second machine management information input from the machine management device 52.

In the third machine management information, damage information such as the type of damage, which is transmitted as a kind of complaint processing from the logistics site in a case where the box is damaged in various logistics processes such as a step of assembling boxes, a step of packaging articles, and a transportation step is associated with the barcode 38 thereof. The damage information corresponds to the defect information of the corrugated board 36 if the cause of damage is in the corrugated board 36, and corresponds to the defect information of the carton-forming corrugated board 37 if the cause of damage is in the carton-forming corrugated board 37.

The integrated management device 9 performs management by collecting the input machine management information and storing the machine management information in a memory, and transmits the machine management information to the machine management devices 51 and 52.

The machine management devices 51 and 52 include defect information acquisition units 51a and 52a that receive the third machine management information transmitted from the integrated management device 9 and acquire defect information thereof, and the machine management devices 51 and 52 can manage the corrugating machine 1 or the carton-forming machine 2 also including the defect information of the third machine management information. That is, on the basis of the defect information of the third machine management information, for example, if the cause of defect can be handled by the change of the manufacturing conditions that can be automatically performed, the change of the manufacturing conditions is performed, and if the cause of defect is the change of the manufacturing conditions or maintenance of the machine requiring the operator' operation, change guide information to change the manufacturing conditions is output. In addition, if the cause of defect is in the corrugating machine 1, information indicating the fact is output.

In addition, it is possible to trace and investigate whether the carton-forming corrugated boards 37 produced at the same time have a similar problem on the basis of the production information such as production date, destination, and lot associated with the barcode 38 from the third machine management information.

[2. Traceability System]

As illustrated in FIG. 1, the traceability system according to the embodiment includes the management system of a package material manufacturing machine, code readers (distribution identification information reading devices) 43 and 44 that read the barcode 38 in the distribution of articles, logistics management devices 53 and 54 that manage the distribution of articles on the basis of the barcode information read by the code readers 43 and 44, and the integrated management device 9 that is a higher-lever management device connected to the machine management devices 51 and 52 and the logistics management devices 53 and 54 to exchange information therewith and integrally manages the machine management devices 51 and 52 and the logistics management devices 53 and 54. In FIG. 1, the components of the traceability system added to the management system of a package material manufacturing machine are illustrated by a two-dot chain line.

In the logistics stage, there are a package step 6 of assembling the carton-forming corrugated board 37 into a three-dimensional box and packaging an article in the box, and a logistics step 7 of transporting the articles (boxes in which the articles are packaged), and when the article is delivered to a destination (for example, user of the article) 8, the logistics is completed.

The first logistics management device 53 manages logistics in the package step 6. That is, in the stage of packaging the article in the assembled box, traceability information in which article information is associated with the barcode information printed on the box is created and transmitted to the integrated management device 9. The traceability information by the first logistics management device 53 includes shipping information of the article such as when and from where to where the article was shipped.

The second logistics management device 54 transmits information such as in the logistics, where the article is currently positioned, that is, which logistics base the article is stored, which logistics base the article has passed through and is being transported by a vehicle or the like, or whether the article has been delivered to the destination 8, as the traceability information to the integrated management device 9.

The integrated management device 9 stores the traceability information in a memory, and provides the traceability information when there is an information providing request.

The barcode 38 printed by the ink jet printer 3 is unique to each corrugated board 36 or each carton-forming corrugated board 37, and it is not allowed that the same barcode 38 is shared by a plurality of corrugated boards 36 or carton-forming corrugated boards 37.

However, since the type of the barcode 38 is limited, the barcode 38 after use is to be used again.

For example, in a case where the defective corrugated board 36 is discarded in the corrugating machine 1 or in a case where the defective carton-forming corrugated board 37 is discarded in the carton-forming machine 2, discard information is sent to the machine management devices 51 and 52 in association with the barcode information, and the barcode 38 after use is to be used again.

Further, even in case of the discard in the logistics stage, the discard information is sent to the machine management devices 51 and 52 in association with the barcode information, and the barcode 38 after use is to be used again. The discard in the logistics stage can be determined when the article is delivered to the destination. Further, the discard due to the damage at the time of assembling a box is also included in the discard in the logistics stage.

[3. Management Method of Package Material Manufacturing Machine]

Next, the management method of a package material manufacturing machine according to the embodiment will be described.

Here, the management method of the corrugating machine 1 and the management method of the carton-forming machine 2 will be described.

Figure 4:
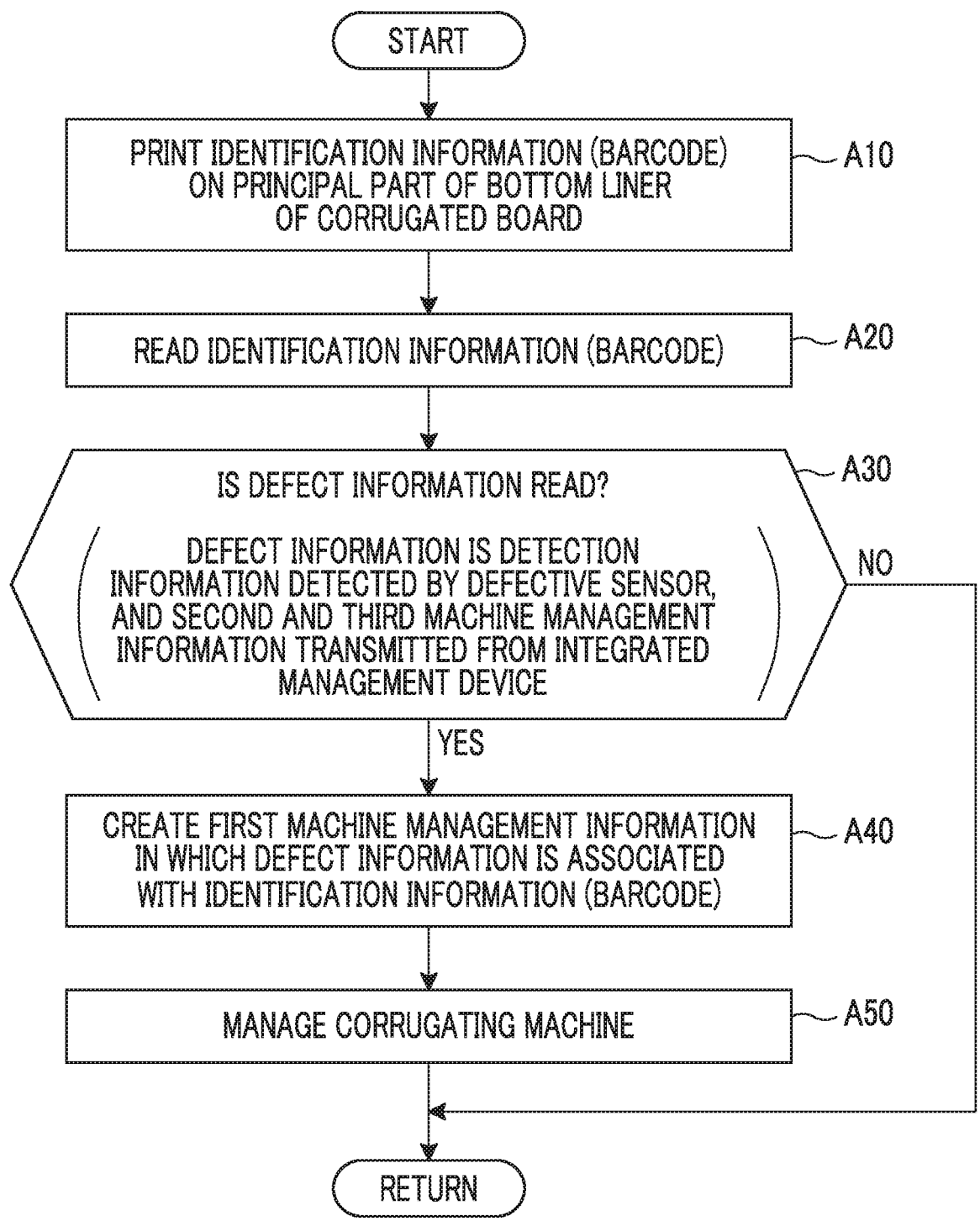
FIG. 4 is a flowchart illustrating an example of a management method of a corrugated board manufacturing apparatus according to an embodiment of the invention.

As illustrated in FIG. 4, the management method of the corrugating machine 1 includes printing the barcode 38 (step A10, printing step) by the ink jet printer 3 on the bottom liner 33 of the corrugated board 36 in the manufacturing process of the corrugated board 36. Then, in the carton-forming machine 2, the barcode 38 is also used in traceability in the distribution of articles using the carton-forming corrugated board 37 manufactured from the corrugated board 36.

Next, the barcode information of each corrugated board 36 is read by the code reader 41 (step A20, identification information reading step). Then, it is determined whether the defect information is acquired (step A30), and in a case where the defect information is acquired, the first machine management information in which the defect information is associated with the barcode information is created (step A40). The corrugating machine 1 is managed on the basis of the first machine management information (step A50, machine management step).

The defect information includes not only the defect information of the first machine management information detected by the defective sensor 1S of the corrugating machine 1, but also the defect information of the second machine management information detected by the defective sensor 2S of the carton-forming machine 2, and the defect information (that is, damage information in which the cause of damage is in the corrugated board 36) transmitted as the third machine management information from the subsequent logistics stage. Thus, it is possible to more properly and efficiently manage the corrugating machine 1. Further, it is possible to stabilize the product quality by specifying the step where the defect has occurred, specifying the cause of defect, and performing improvement processing, and it is possible to improve the production efficiency, that is, the productivity since the production capacity decreases as the process goes to the latter stage.

Figure 5:
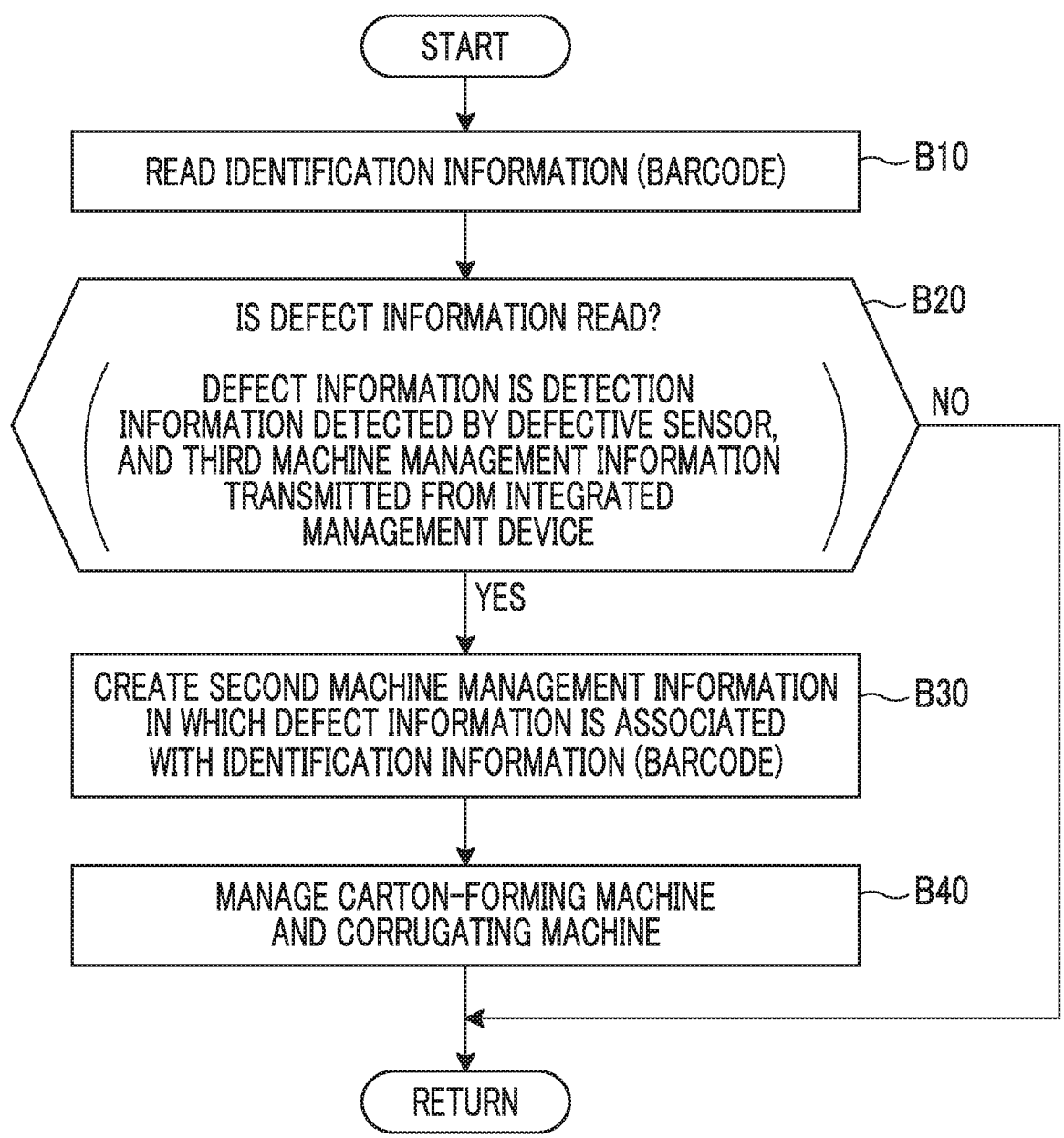
FIG. 5 is a flowchart illustrating an example of a management method of a carton-forming machine according to an embodiment of the invention.

As illustrated in FIG. 5, the management method of the carton-forming machine 2 includes reading the barcode information of each carton-forming corrugated board 37 by the code reader 42 (step B10, identification information reading step). Then, it is determined whether the defect information is acquired (step B20), and in a case where the defect information is acquired, the second machine management information in which the defect information is associated with the barcode information is created (step B30). The carton-forming machine 2 is managed on the basis of the second machine management information and the corrugating machine 1 is also managed (step B40, machine management step).

Even in this case, the defect information includes not only the defect information of the second machine management information detected by the defective sensor 2S of the carton-forming machine 2, but also the defect information (that is, damage information in which the cause of damage is in the carton-forming corrugated board 37) transmitted as the third machine management information from the subsequent logistics stage. In this manner, it is possible to more properly and efficiently manage the corrugating machine 1, it is possible to stabilize the product quality by specifying the step where the defect has occurred, specifying the cause of defect, and performing improvement processing, and it is possible to improve the production efficiency, that is, the productivity since the production capacity decreases as the process goes to the latter stage.

[4. Action and Effect]

The management system of a package material manufacturing machine, the traceability system, and the management method of the package material manufacturing machine according to the embodiment are configured as described above, and thus the following effects can be obtained.

Since the barcode 38 usable in the traceability system is used in the management of the corrugating machine 1 and the carton-forming machine 2, it is possible to improve the productivity by efficiently performing machine management.

In particular, since the third machine management information relating to the corrugated board 36 or the carton-forming corrugated board 37 is acquired even from the logistics stage in which the barcode is the target of the traceability, and is used in the machine management, it is possible to properly manage the corrugating machine 1 and the carton-forming machine 2.

Such management is realized because the barcode 38 is printed in the corrugating machine 1, which is the most upstream side in the traceability system, and it is possible to use one barcode 38 in a wide range from the management of the corrugating machine 1 and the carton-forming machine 2 to the logistics management.

The machine management information in which the barcode 38 is associated with the defect information has versatility, and it is possible to improve the productivity by sharing information between the first machine management device 51 and the second machine management device 52, for example.

That is, since the package materials become more dispersed as they go to the downstream steps in the traceability system, the efficiency of printing the barcode 38 is low and the use of the barcode 38 is limited so that it is difficult to improve the productivity, but conversely, since the package materials become more concentrated as they go to the upstream steps in the traceability system, the efficiency of printing the barcode 38 is high and the range of use of the barcode 38 can be expanded so that it is easy to improve the productivity. From this point of view, with the present system, it is possible to improve the productivity of the package materials (corrugated board 36 and carton-forming corrugated board 37).

Since the type of defect also includes defects requiring discard due to waste paper generated in the splice or order change, and dirt generated during delivering the corrugated board 36 from a machine to a machine (for example, from the corrugating machine 1 to the carton-forming machine 2) in addition to the product defect, it is possible to perform improvement of the fraction defective due to the defect, and it is also possible to perform improvement by statistically analyzing the generation data of waste paper and other waste paper and rearranging the production or specifying the location of the discard.

In the embodiment, the barcode 38 is printed in the corrugating machine 1, which is the most upstream side in the traceability system, but as illustrated by a two-dot chain line in FIG. 1, even in a case where the barcode 38 is printed by providing the ink jet printer 3 to the carton-forming machine 2, it is possible to obtain the effects by sharing the barcode 38 for both the logistics management and the machine management. In this case, as illustrated by a two-dot chain line in FIG. 3, it is preferable to dispose the ink jet printer 3 immediately after the sheet feed section, immediately before the printing section, and immediately after the printing section.

Further, since the machine management device 51 of the corrugating machine 1 and the machine management device 52 of the carton-forming machine 2 can transfer information by the integrated management device 9 which is the higher-lever management device, for example, even in a case where the corrugating machine 1 and the carton-forming machine 2 are far from each other or belong to other companies, it is possible to improve the productivity by sharing the machine management information and using the machine management information in the machine management.

Since the code readers 41 and 42 are disposed at the downstream portions of the corrugating machine 1 and the carton-forming machine 2, there is an effect of increasing the degree of freedom in disposing the ink jet printer 3.

Furthermore, since the barcode 38 used in the discarded or almost discarded package material in the corrugating machine 1, the carton-forming machine 2, or the logistics stage is used again, even if this system is introduced on a large scale, the barcode 38 can be printed without any trouble.

Since the machine management devices 51 and 52 change the manufacturing conditions or output the change guide information when the defect occurs, it is possible to properly perform machine management.

[5. Others]

The embodiment of the invention has been described, but the invention is not limited to the embodiment.

For example, in the embodiment, since the management system of a package material manufacturing machine is included in the traceability system, the machine management is performed using the information from the logistics side, but it is possible to obtain the effect of improving certain productivity even by separating the management system of a package material manufacturing machine and the traceability system and sharing only the barcode.

On the other hand, it is also possible to construct a larger system by clustering the traceability system including the management system of a package material manufacturing machine, and it is possible to perform more efficient operation of the barcode and the like.

In the embodiment, the corrugated board and the carton-forming corrugated board are exemplified as the package materials, but the package materials are not limited thereto.

REFERENCE SIGNS LIST

1: corrugated board manufacturing apparatus (corrugating machine)
2: carton-forming machine
1S: defective sensor as first defect information acquisition device
2S: defective sensor as second defect information acquisition device
3: ink jet printer as printing unit
6: package step
7: logistics step
9: integrated management device (higher-lever management device)
11: single facer
16: double facer
17: slitter scorer
18: cutoff
19: stacker
21: sheet feed section
22: printing section
23: slotter creaser section
24: die cutting section
25: folding section
26: counter ejector section
36: corrugated board
37: carton-forming corrugated board
41, 42: code reader as identification information reading device
43, 44: code reader as distribution identification information reading device
51: first machine management device
52: second machine management device
51a, 52a: defect information acquisition unit
53: first logistics management device
54: second logistics management device

The invention claimed is:

1. A management system of a package material manufacturing machine that manufactures a package material usable in distribution of articles, the management system comprising:

printing units in a process of manufacturing the package material, printing on package material unique identification information which is usable in traceability in the distribution of the articles;

identification information reading devices installed downstream of the printing units and reading the identification information; and machine management devices acquiring individual characteristic information of the package material, and managing the manufacturing machine on the basis of machine management information in which the acquired individual characteristic information is associated with the identification information read by the identification information reading devices, wherein the manufacturing machine includes a carton-forming machine that manufactures a carton-forming corrugated board from a corrugated board, the identification information reading device is installed on a downstream portion of the carton-forming machine, the individual characteristic information includes defect information of a defective carton-forming corrugated board as the carton-forming corrugated board which is defective, the management system further comprises a second defect information acquisition device that detects the defective carton-forming corrugated board from among the manufactured carton-forming corrugated boards to acquire the defect information, and when the second defect information acquisition device acquires the defect information, the machine management device changes manufacturing conditions of the manufacturing machine or outputs change guide information for changing the manufacturing conditions on the basis of the defect information acquired by the second defect information acquisition device.

2. The management system of a package material manufacturing machine according to claim 1,
wherein in a case where the defective carton-forming corrugated board is discarded, the printing unit uses again the identification information printed on the discarded defective carton-forming corrugated board, and performs subsequent printing.

3. A management system of a package material manufacturing machine that manufactures a package material usable in distribution of articles, the management system comprising:
printing units in a process of manufacturing the package material, printing on package material unique identification information which is usable in traceability in the distribution of the articles;
identification information reading devices installed downstream of the printing units and reading the identification information; and
machine management devices acquiring individual characteristic information of the package material, and managing the manufacturing machine on the basis of machine management information in which the acquired individual characteristic information is associated with the identification information read by the identification information reading devices,
wherein the manufacturing machine includes a carton-forming machine that manufactures a carton-forming corrugated board from a corrugated board,
the identification information reading device is installed on a downstream portion of the carton-forming machine,
wherein the machine management device further comprises a defect information acquisition unit that acquires defect information of the carton-forming corrugated board transmitted from a distribution system of the articles, and
when the defect information acquisition unit acquires the defect information, the machine management device changes manufacturing conditions of the manufacturing machine or outputs change guide information for changing the manufacturing conditions on the basis of the defect information acquired by the defect information acquisition unit.

4. A management system of a package material manufacturing machine that manufactures a package material usable in distribution of articles, the management system comprising:
printing units in a process of manufacturing the package material, printing on package material unique identification information which is usable in traceability in the distribution of the articles;
identification information reading devices installed downstream of the printing units and reading the identification information; and
machine management devices acquiring individual characteristic information of the package material, and managing the manufacturing machine on the basis of machine management information in which the acquired individual characteristic information is associated with the identification information read by the identification information reading devices,
wherein the manufacturing machine includes a carton-forming machine that manufactures a carton-forming corrugated board from a corrugated board,
the identification information reading device is installed on a downstream portion of the carton-forming machine,
in a case where use end information of the carton-forming corrugated board transmitted from a distribution system of the articles is acquired, the printing unit uses again the identification information printed on the carton-forming corrugated board of which the use is ended, and performs subsequent printing.

\* \* \* \* \*